3,527,625
SOLDERING PASTE

Gilman B. Mollring, Los Angeles, Calif.; Mary Betty Mollring, executrix of said Gilman B. Mollring, deceased
No Drawing. Filed Dec. 5, 1967, Ser. No. 688,015
Int. Cl. B23k 35/28, 35/36
U.S. Cl. 148—24                              7 Claims

ABSTRACT OF THE DISCLOSURE

An improved soldering paste composed of a pulverized solder alloy in an amount greater than 70% by weight, a suspending agent consisting essentially of a vegetable oil amine modified with an oleate amine in an amount of 12%–20% by weight, and a chloride fluxing agent in a minor proportion.

---

It is the object of this invention to provide as an article of commerce a vastly improved soldering paste. It is a still further object of this invention to provide an alkaline water soluble base or suspending agent for the powdered solder or metal alloy employed in my formulation.

The present day soldering pastes usually consist of a powdered solder or metal alloy which consists of two or more metals having a melting point below that of any of the constituent metals, and is used for joining certain other metals together by filling a joint or covering the juncture, as distinguished from brazing, welding etc. Ordinarily this solder is an alloy of equal parts of lead and tin, and melts at about 188° C. Zinc solder consists of three parts of lead and five parts of tin and melts at about 176° C. Solder for brass or copper consists of two parts of lead and five parts of tin and melts at about 170° C. Solders of melting points down to say about 85° C. are made of lead, tin and bismuth. All in all by modifying the amount of each it is possible to adjust the melting point, tensile strength, fluidity, shear strength, elongation, Brinell hardness and density etc., to suit the purpose for which it is intended. In making a paste solder it is the normal practice to employ about 70 to 85% by weight of a pulverized metal alloy mixed with and suspended in greasy wax as for instance olein, palmitin, stearin etc., together with a suitable fluxing agent such as zinc or ammonium chloride for example. The fluxing agent usually represents about .25% to 1.00% of the total paste solder and the suspending agent of tallow etc., represents about 15 to perhaps 20% of the total product.

The above mentioned soldering paste if used in a large scale assembly line production has one objectionable feature in that after the paste solder has been heated to the desired temperature the residue of grease has a tendency to build up on the fixtures of the assembly line and develop a water immiscible buildup which makes for a very unsatisfactory job condition. Quite frequently too this type of paste soldering compound leaves a greasy residue at the area of melted solder and the part or parts soldered may have to be placed in a degreasing tank such as one containing trichlorethylene or tetrachlorethylene.

I have discovered that I can vastly improve the present day soldering pastes by employing an alkaline water soluble paste, suspending agent or dispersing agent for my pulverized metal alloy together with or without a fluxing agent such as for example zinc or ammonium chloride. In general I may employ any one or combinations of any natural or synthetic water soluble detergents, soaps, fats, oils, resins, sulfonated oils, fatty acids, resins, hydrocarbons, alcohols, glycols, oxyethers, amides, amines, polystyrene, carbazol, naphthenic acid, turkey red oil, cholestrome, sulfonic acid, sulfonated hydrocarbons derived from styrene, tannic acid with sulfonated linseed oil, metal sulfonates with glycerine and the like. Included in this group are the unclassified soaps such as $NH_3$, Na, Mg, and Ca either alone or in combination with vegetable, animal or mineral oil heated with sulfur and saponified with alkali. Included too are the hydrogenated glycerides, fatty acids, brominated oils and the surface active agents miscible with water.

Specifically the water soluble alkaline, paste, suspending or dispersing agent I like to employ with my pulverized metal alloy is a modified coco alkylolamine and has the following general physical properties.

| | |
|---|---|
| Form | Viscous liquid. |
| Organic ingredient | 99.5. |
| Refractive index | 1.473/30° C. |
| Specific gravity | 1.0021 at 25° C. |
| ASTM viscosity | 35.4 |
| Viscosity Brookfield | 19.8 poises at 25° C. |
| Pour point | 10° F. |
| pH of 5% solution | 9.15 at 25° C. |
| Color | Amber. |
| Smoke, flash and fire point | None (boils). |

The above described synthetic detergent is a product of Swift and Company and is a coconut oil amine condensate modified with an oleate amine. This particular liquid when combined with water in the ratio of about 80 parts of liquid to about 20 parts by weight of water will produce a gell like paste which in turn provides a very excellent vehicle as a suspending or dispersing agent for both my pulverized metal alloy and or fluxing agent if used. The following example will serve to illustrate one formulation of a very good soldering paste.

EXAMPLE 1

| | Parts by wt. |
|---|---|
| Coco alkylolamine | 50 |
| Water | 10 |
| Ammonium chloride | 5 |
| 50–50 tin, lead pulverized alloy | 240 |

As a variant to the above process I sometimes use a potassium base soap paste as a means of increasing the viscosity of my coco alkylolamide or paste solder usually in the ratio of about 3 to 20 parts by weight of a potassium soap base to 80 to 97 parts by weight of my coconut alkylolamide.

The following example will more clearly indicate the approximate percentage of each of the components I may use in my improved soldering paste:

| | Percent by wt. |
|---|---|
| Coco alkylolamine | 12 to 20 |
| Water | 2 to 5 |
| Zinc or ammonium chloride | 0 to 3 |
| Pulverized metal alloy | 70 to 80 |

The components above mentioned may be mixed together with ease at atmospheric temperature and will result in a homogeneous paste like mixture ready for use in general soldering practice.

In some instances I may employ no zinc or ammonium chloride as a fluxing agent and in other instances I may prefer to use a small quantity of either or both.

While I have specifically mentioned a modified coco alkylolamine as the base or vehicle I prefer to employ as a suspending or dispersing agent for my pulverized metal alloy and fluxing agent if any, I also mean to include other saponifiable fatty acids such as caproic, lauric, palmitic, myristic, oleic and in general all the water soluable natural or synthetic amines.

I claim:

1. A soldering paste composed principally of a pulverized solder alloy;
a chloride fluxing agent in a minor proportion;
and a water soluble alkaline suspending agent, said alloy being in a proportion not less than 70% by weight and said suspending agent in a proportion between 12% and 20% by weight of the total composition;
said suspending agent consisting essentially of vegetable oil amine condensate modified with an oleate amine, in the form of a viscous liquid which, when mixed with water in the proportion of 80 parts agent to 20 parts water, will be converted into a gell like paste for suspending the pulverized alloy.

2. The composition defined in claim 1, wherein the water soluble suspending agent, the chloride fluxing agent and the pulverized solder alloy consist essentially of approximately 15%, 2% and 83%, respectively, of the composition.

3. The composition defined in claim 1, wherein said suspending agent has no fire, smoke or flash point.

4. The composition defined in claim 1, wherein said suspending agent is coco alkylolamine.

5. The composition defined in claim 1, wherein said solder alloy is composed of equal parts of pulverized lead and tin.

6. The composition defined in claim 1, wherein said solder alloy is composed of equal parts of pulverized lead and tin;
said suspending agent is coco alkylolamine and said chloride is selected from the group consisting essentially of zinc and ammonium chlorides.

7. The composition defined in claim 1, wherein said soldering paste is composed of equal parts of pulverized lead and tin and constitutes 240 parts of said composition by weight;
said suspending agent is coco alkylolamine and constitutes 50 parts of said composition;
said chloride is ammonium chloride and constitutes 5 parts of said composition;
and including water in the proportion of ten parts of said composition.

References Cited

UNITED STATES PATENTS

| | | | |
|---|---|---|---|
| 2,547,771 | 4/1951 | Pessel | 148—24 |
| 2,553,226 | 5/1951 | Williams | 148—24 |
| 3,073,270 | 1/1963 | Johnson et al. | 148—24 |

L. DEWAYNE RUTLEDGE, Primary Examiner

WAYLAND W. STALLARD, Assistant Examiner